United States Patent Office 2,872,979
Patented Feb. 10, 1959

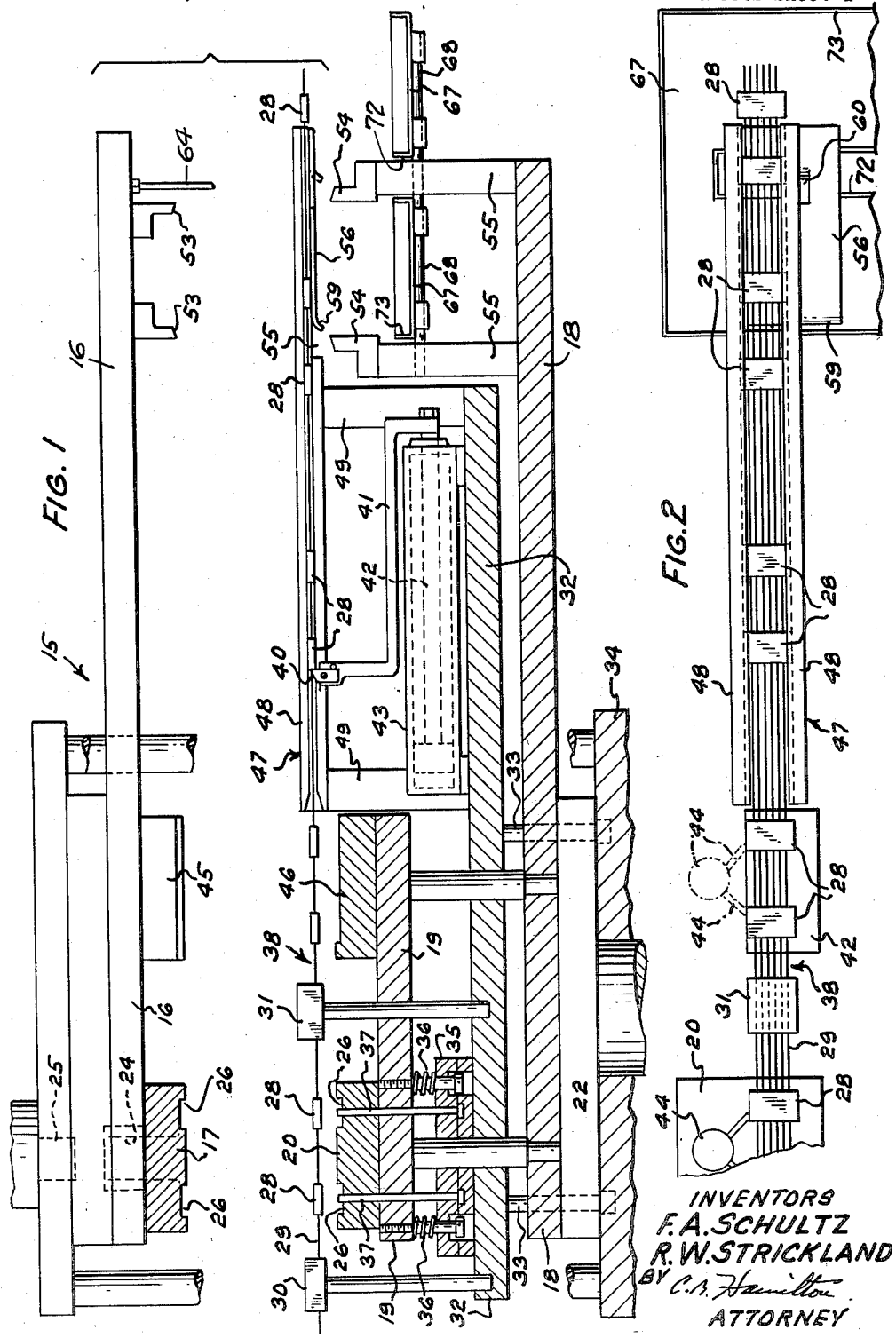

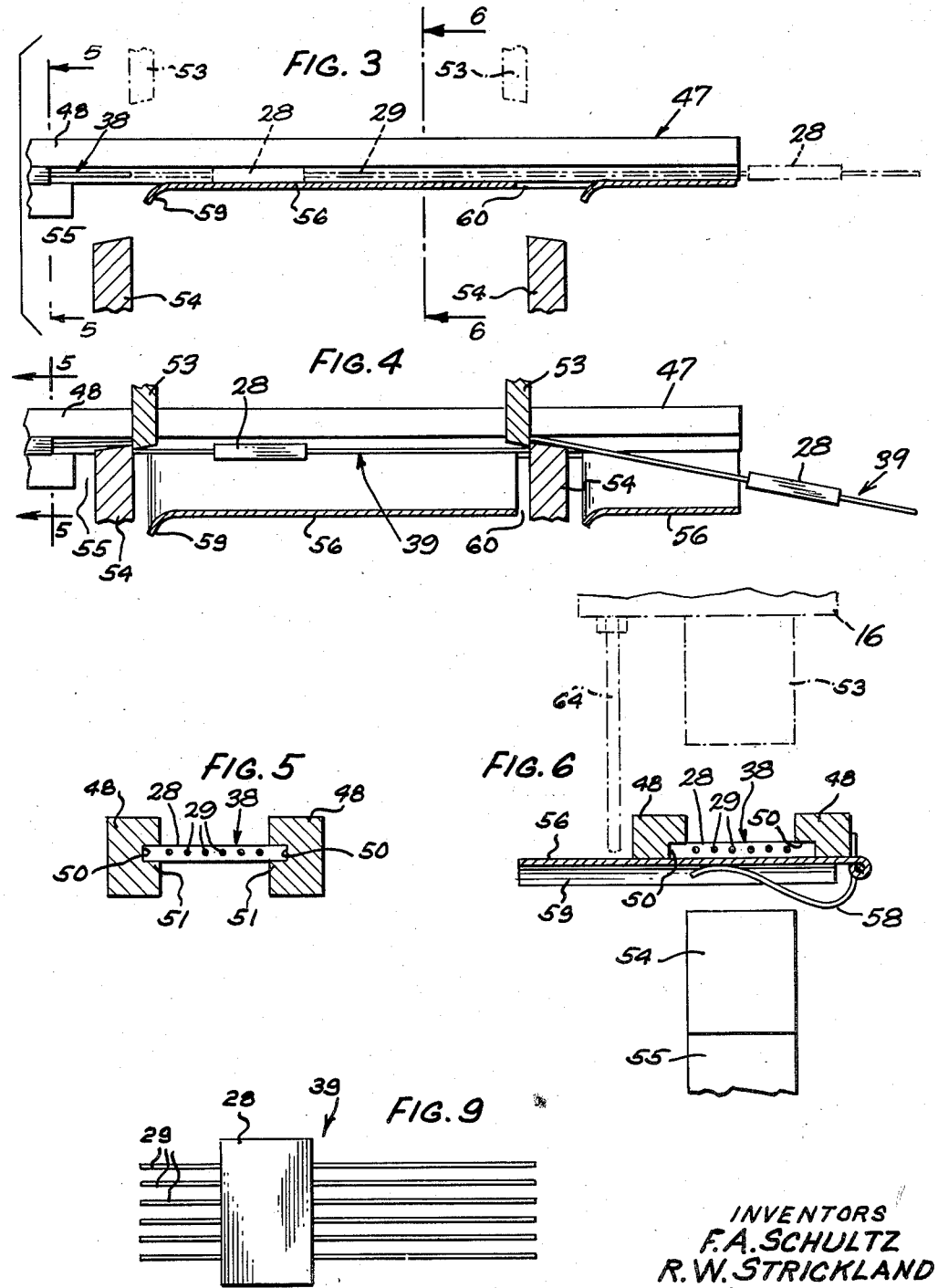

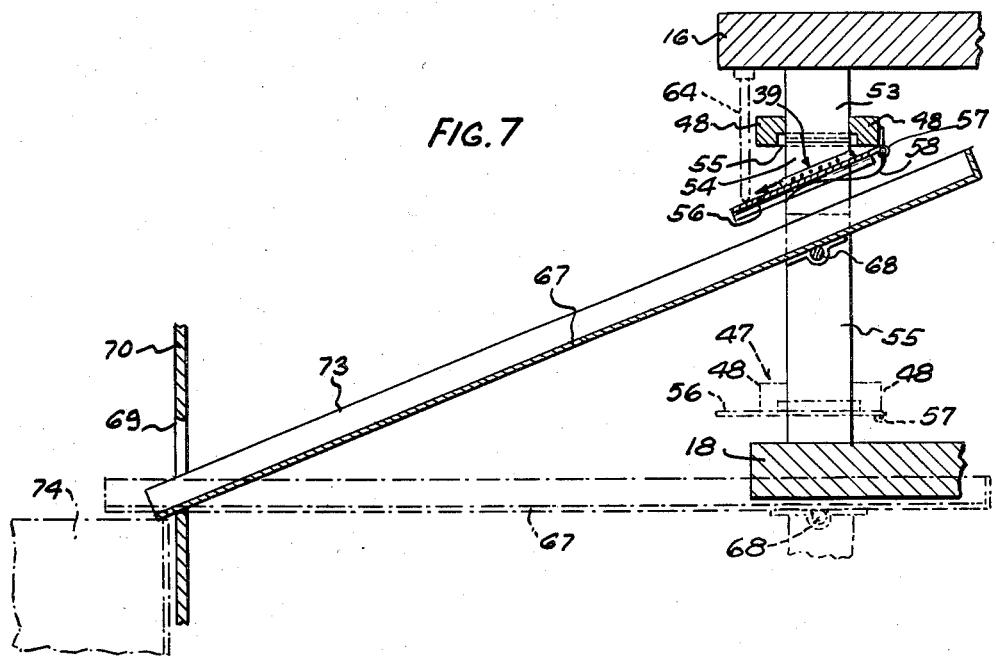
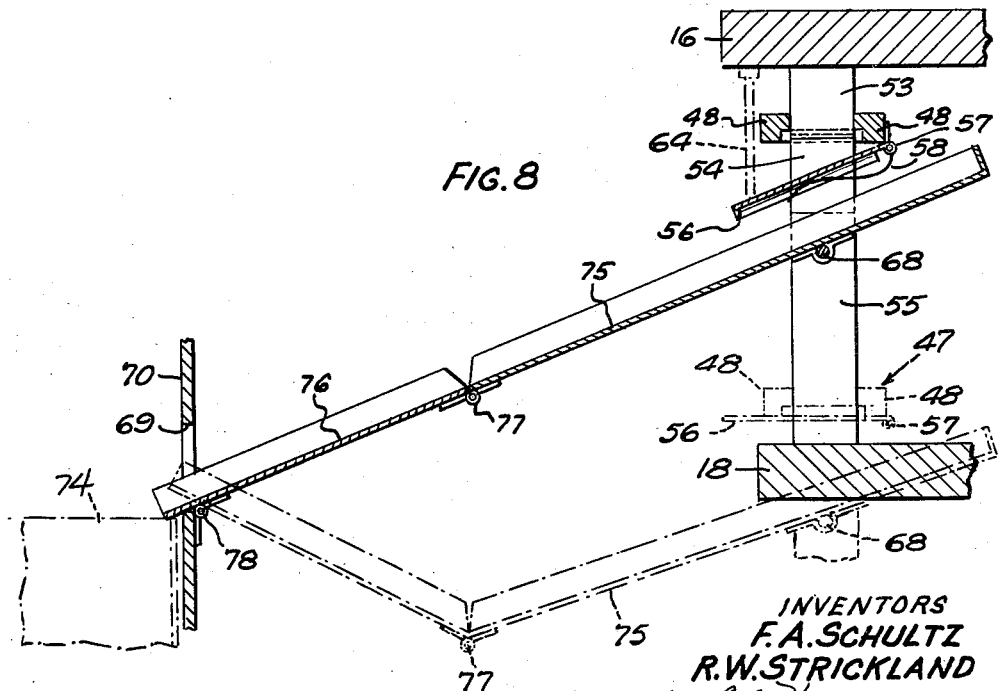
INVENTORS
F. A. SCHULTZ
R. W. STRICKLAND
BY C. B. Hamilton
ATTORNEY

2,872,979

ARTICLE SEVERING AND DISCHARGING MECHANISM

Frank A. Schultz, La Grange, and Robert W. Strickland, Chicago, Ill., assignors to Western Electric Company, Incorporated, New York, N. Y., a corporation of New York Application March 30, 1954, Serial No. 419,828

6 Claims. (Cl. 164—48)

This invention relates to an apparatus for making a continuous composite strip of interconnected articles and more particularly to a mechanism for severing articles from the composite strip and discharging them from the apparatus.

An object of the present invention is to provide an improved mechanism for discharging articles as they are severed from a continuous strip of interconnected articles.

A further object of the invention is to provide means for severing articles from a continuous strip of interconnected articles.

A device illustrating certain features of the invention as applied to a molding press for molding blocks of insulating material intermittently and in spaced relation to each other onto a plurality of continuous parallel wires may include a pair of upper and a pair of lower cutters actuated in timed relation to the molding operations for shearing the strip to sever a pair of articles therefrom, means for advancing the strip intermittently in timed relation to the molding of the blocks, and a guide for guiding the strip into the path of the cutter, which guide has a discharge opening for discharging the articles severed from the strip. A closure plate pivotally mounted on the guide is yieldably held in closed position for supporting the strip for movement over the discharge opening in the guide and the plate is actuated to open position to discharge the severed articles in response to actuation of the cutters and the severed articles fall into a chute which has one end thereof pivotally mounted on the lower cutter for reciprocation therewith and has the other end resting in a discharge opening in a front wall of the apparatus for directing the severed articles therethrough to a predetermined position.

Other objects and advantages of the invention will become apparent by reference to the following detailed description and the accompanying drawings illustrating a preferred embodiment thereof, in which Fig. 1 is a diagrammatic vertical longitudinal elevational sectional view of a molding press with the improved severing and discharging mechanism thereon;

Fig. 2 is a fragmentary diagrammatic plan view of the molding apparatus and the strip of articles formed thereby;

Fig. 3 is an enlarged vertical sectional view through a portion of the guide for supporting the strip of articles showing the parts in one position;

Fig. 4 is a view similar to Fig. 3 showing the parts in a different position;

Figs. 5 and 6 are cross-sectional views taken on the lines 5—5 and 6—6, respectively, of Fig. 3;

Fig. 7 is a fragmentary end elevational view of the apparatus showing the pivoted chute for guiding the severed articles from the machine;

Fig. 8 is a view similar to Fig. 7 showing a modified embodiment of chute construction; and Fig. 9 is an enlarged view of the article.

Referring to the drawings Fig. 1 shows diagrammatically a molding press 15 having an upper stationary platen 16 for supporting an upper heated die section 17, and a lower movable composite platen 18, including a plate 19 for supporting a lower heated die section 20. The lower platen is adapted to be reciprocated by a ram 22 to move the lower die section 20 to and from an upper position in engagement with the upper die section 17. A preform of plastic molding material is adapted to be deposited in an injection chamber 24 in the upper die section and a plunger 25 of a power actuated injector is adapted to force the plastic molding material into a pair of mold cavities 26 formed in the die sections to mold a pair of blocks 28—28 about a plurality of parallel wires 29 fed thereinto. The wires 29 are guided for advancing movement in a pair of guides 30—31 which are carried by a knockout plate 32. The guide 31 is adapted to permit the movement of the blocks 28 therethrough. During the latter part of the downward movement of the ram the knockout plate 32 is engageable with a plurality of stationary pins 33 carried by the bed 34 of the press for arresting the movement of the knockout plate 32 and effecting relative movement between the knockout plate and the lower platen 18. An auxiliary knockout plate 35 suspended on a plurality of headed pins 36 on the plate 19 in a normal position spaced about one half inch above the knockout plate 32 carries a pair of knockout pins 37 for ejecting the blocks 28 from the lower die section in response to the upward movement of the knockout plate 32. The guides 30 and 31 are moved in advance of the knockout pins 37 and after the blocks 28 are ejected thereby from the lower die section, the wires 29 are tensioned by means (not shown) to hold the blocks 28 above the knockout pins 37 as the wires are advanced.

Successive pairs of blocks 28 are molded onto the wires 29 and the wires are intermittently advanced predetermined distances after each molding operation to form a continuous composite strip 38 which is adapted to be cut into sections to form articles 39 (Fig. 9), each of which forms a component of a relay. A pivoted feed pawl 40 engageable with the blocks 28 is mounted on an arm 41 which is fixed to a reciprocable piston 42 for advancing the strip 38 of interconnected articles. The piston 42 is reciprocable through a predetermined distance within a cylinder 43 of a pneumatic actuator which is secured to the knockout plate 32 for vertical movement therewith.

The cull and runners 44 adhering to the molded blocks 28 after the molding operation may be trimmed from the blocks by a trimming punch 45 and die 46 mounted on the stationary and movable platens 16 and 19, respectively.

The composite strip 38 is supported for horizontal movement in a guide 47 comprising a pair of rails 48—48 which are mounted on supports 49 fixed to the plate 32 for movement therewith. The rails 48 are provided with longitudinally extending grooves 50 for receiving the end portions of the blocks 28 therein, the ends of the blocks 28 being supported on ledges 51 formed on the rails 48.

A pair of upper fixed cutters 53—53 mounted on the upper platen 16 above the path of travel of the strip 38 and a pair of lower movable cutters 54—54 mounted below the composite strip 38 are adapted to sever the strip at spaced points to form a pair of articles 39. The lower cutters 54 are mounted on supports 55 fixed to the plate 18 for vertical movement therewith. The cutters 54 and 55 fit between the rails 48 and sever the wires 29 as shown in Fig. 4. In response to the upward movement of the ram 22 the movable platen 18 carries the lower cutters 54 and the molding die section 20 upwardly into engagement with the wires 29 of the composite strip 38 at which time the platen 18 picks up the plate 32 and the guides 30, 31, and 47 thereon and carries them with the composite strip 38 upwardly until the lower cutters 54 engage the fixed cutters 53 (Fig. 4) to sever a pair of articles 39 from the strip 38, and the molding die section 20 and the trimming die 46 engage the molding die section 17 and the trimming punch 45, respectively.

The lower portions of the rails 48 are removed adjacent the cutters 54 to provide an opening 55 in the guide 47 for the discharge of the articles 39 therefrom after they have been severed from the strip 38. A plate 56 is provided for closing the discharge opening 55 and supporting the composite strip 38 as it is advanced in the guide when the ram 22 is in its lower position and the cutters 53 and 54 and the guide 47 are in separated relation to each other as shown in Fig. 1. The plate 56 is pivotally connected to a rail 48 by means of hinges 57 for swinging movement to and from a closed position shown in Fig. 6 and the plate 56 is yieldably maintained in its normal closed position by a spring 58. The forward edge 59 of the plate 56 is curved downwardly to facilitate the feeding movement of the composite strip 38. The plate 56 has an aperture 60 therein providing clearance for one of the cutters 54.

A stationary actuating rod 64 is adapted to engage the plate 56 and move it to open position during the upward movement of the ram 22 and prior to the engagement of the cutters 54 with the cutters 53 to shear a pair of articles 39 from the strip 38. The rod 64 engages and depresses the plate 56, causing it to swing downwardly to the position shown in Fig. 7 to uncover the opening 55 of the guide 47 and permit the pair of articles 39 severed by the cutters 54 to be discharged from the guide 47 and slide down from the plate 56 into a chute 67.

One end of the chute 67 is pivotally mounted on a rod 68 which is supported on the vertical supports 55 for vertical reciprocation with the lower cutters 54. The lower end of the chute 67 extends through a discharge opening 69 in a front wall 70 of a housing enclosing a portion of the apparatus. The central portion of the chute 67 is slotted at 72 to provide clearance for one of the supports 55 for the lower cutter 54 and the edge portions 73 of the chute are bent upwardly to guide the articles 39 during their movement along the chute. As the articles 39 are severed from the composite strip 38 and fall from the guide 47 onto the plate 56 and then onto the chute 67, the chute is sloping as shown in Fig. 7 and directs the pair of articles through the opening 69 in the wall 70 and into a receptacle 74 therefor. The chute 67 is caused to oscillate as the ram 22 reciprocates, the discharge end of the chute 67 remaining substantially at a constant level while the other end of the chute reciprocates with the cutters 54. If desired the receptacle 74 may be positioned so that the discharge end of the chute rests on the upper edge thereof and is supported thereby.

In the form of construction shown in Fig. 8 the chute is made in two sections 75 and 76 hinged together at 77. The section 75 is pivotally supported on the rod 68 fixed to the supports 55 for movement therewith and the section 76 is hinged at 78 to the wall 70 and the sections 75 and 76 of the chute move to and from the full and dotted line positions shown in Fig. 8 during the operation of the apparatus.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for forming a continuous composite strip, the combination of a guide for supporting the composite strip for horizontal movement as it comes from the apparatus, a pair of longitudinally spaced upper cutters and a pair of longitudinally spaced lower cutters operable for simultaneously severing a pair of sections from said strip, means for intermittently advancing said strip a predetermined distance to feed successive portions thereof into the path of the cutters, means for moving the lower cutters and for effecting relative movement between the cutters and the guide to cause the severance of a pair of said sections from said strip, said guide having a discharge opening for said sections adjacent said cutters, a plate pivotally mounted on said guide between said longitudinally spaced cutters for closing the discharge opening in said guide, means for yieldably retaining said plate in a closed position to support the strip for movement over said discharge opening, and an element engageable with said plate in response to the actuation of said cutters for moving said plate to an open position for discharging said pair of severed sections.

2. In an apparatus for forming interconnected articles in a continuous composite strip, the combination of a guide for supporting the composite strip for horizontal movement as it comes from the apparatus, a pair of longitudinally spaced upper cutters and a pair of longitudinally spaced lower cutters operable for simultaneously severing a pair of articles from said strip, means for intermittently advancing said strip a predetermined distance to feed successive pairs of interconnected articles into the path of the cutters, means for moving the lower cutters and for effecting relative movement between the cutters and the guide to cause the severance of said pair of articles from said strip, said guide having a discharge opening for said articles adjacent said cutters, a plate pivotally mounted on said guide between said longitudinally spaced cutters for closing the discharge opening in said guide, means for yieldably retaining said plate in a closed position to support the strip for movement over the discharge opening into cutting position, means for moving said plate to an open position for discharging the articles in response to the actuation of said cutters, a chute for receiving the severed articles and guiding them to a predetermined location, and means for pivotally supporting one end of said chute for movement with the lower cutters to position a portion of the chute in close proximity to the guide as the articles are severed.

3. In an apparatus for forming a continuous composite strip, the combination of a vertically movable guide for supporting the composite strip for horizontal movement as it comes from the apparatus, a pair of stationary longitudinally spaced upper cutters and a pair of longitudinally spaced lower cutters operable for simultaneously severing a pair of sections from said strip, means for intermittently advancing said strip a predetermined distance to feed successive portions thereof into the path of the cutters, means for moving the lower cutters and the guide toward the upper cutters to cause the severance of a pair of said sections from said strip, said guide having a discharge opening adjacent said cutters for said sections, a plate pivotally mounted on said guide between said longitudinally spaced cutters for closing the discharge opening in said guide, means for yieldably retaining said plate in a closed position to support the strip for movement over said discharge opening into cutting position, a stationary element engageable with the plate to move it to open position for discharging the pair of severed sections in response to upward movement of the guide and the lower cutters, a chute for receiving the severed articles and directing them to a predetermined location, means for supporting one end of the chute at said location, and means for pivotally connecting the other end of the chute to the lower cutter for movement therewith to position a portion of the chute in close proximity to the guide and the plate thereon when the sections are severed from the composite strip.

4. In an apparatus for forming a continuous composite strip, the combination of a vertically movable guide for supporting the composite strip for horizontal movement as it comes from the apparatus, a pair of stationary longitudinally spaced upper cutters disposed above said guide and a pair of longitudinally spaced lower cutters disposed below said guide operable for simultaneously severing a pair of sections from said strip, means for intermittently advancing said strip a predetermined distance to feed successive portions thereof into the path of the cutters, means for moving the lower cutters and the guide toward the upper cutters for effecting relative movement between the cutters and said strip to sever a pair of said articles therefrom, said guide having a discharge opening for the severed articles, a plate pivotally mounted on said guide between said longitudinally spaced cutters for closing the discharge opening in said guide, means for yieldably retaining said plate in a closed position to support the strip for movement over said discharge opening, and a stationary element engageable with said plate in response to the actuation of said cutters and the movement of said guide for actuating said plate to an open position for discharging said pair of severed sections.

5. In an apparatus for molding blocks in spaced relation to each other onto a plurality of parallel wires to form a composite strip of interconnected articles, a pair of vertically movable guide bars for receiving the ends of the blocks to support the strip for horizontal movement with the wires positioned between the guide bars, a pair of longitudinally spaced upper cutters and a pair of longitudinally spaced lower movable cutters for cutting the wires to sever simultaneously a pair of articles from the composite strip, means for intermittently advancing the composite strip a predetermined distance to feed successive pairs of interconnected articles into cutting position to be severed by the cutters, means for reciprocating the lower cutters and for effecting relative movement between the cutters and the guide bars to cut off a pair of the articles from the strip, the guide bars being shaped to provide a discharge opening for the articles as they are severed, a plate pivotally mounted on one of said guide bars between the longitudinally spaced cutters, means for yieldably retaining said plate in closed position to support the composite strip for movement over said discharge opening into cutting position, a stationary element engageable with said plate in response to upward movement of said lower cutters and the guide bars for moving the plate downwardly to an open position to discharge the severed articles.

6. In an apparatus for molding blocks in spaced relation to each other onto a plurality of parallel wires to form a composite strip of interconnected articles, a pair of vertically movable guide bars having grooves therein for receiving the end of said blocks to support the strip for horizontal movement, a pair of longitudinally spaced upper stationary cutters and a pair of cooperable longitudinally spaced lower movable cutters for simultaneously severing a pair of articles from the composite strip, means for intermittently advancing said strip a predetermined distance to feed successive pairs of interconnected articles into position to be severed by the cutters, means for moving the lower cutters into engagement with the wires of the composite strip and for moving the guide bars and the lower cutters together toward the upper cutters to sever a pair of the articles from the strip, said guide bars being shaped to provide a discharge opening for the articles as they are severed, a plate pivotally mounted on one of the guide bars for closing the discharge opening, means for yieldably retaining the plate in closed position to support the composite strip for movement over the discharge opening, a stationary element engageable with said plate in response to upward movement of said lower cutter and said guide bars for tilting said plate to open position to cause the severed articles to slide therefrom, a chute for receiving the severed articles and guiding them to a predetermined location, means for supporting one end of the chute at said location, and means for pivotally connecting the other end of the chute to the lower cutters for movement therewith to position a portion of the chute in close proximity to the guide bars and the plate thereon when the articles are severed.

References Cited in the file of this patent

UNITED STATES PATENTS

| | | |
|---|---|---|
| 734,215 | Bilgram | July 21, 1903 |
| 810,845 | Cromwell | Jan. 23, 1906 |
| 1,058,799 | Shuster | Apr. 15, 1913 |
| 1,150,541 | Ryan | Aug. 17, 1915 |
| 1,337,458 | Lamb | Apr. 20, 1920 |
| 1,495,806 | Rudolphi | May 27, 1924 |
| 1,949,602 | Case | Mar. 6, 1934 |
| 2,110,777 | Streine | Mar. 8, 1938 |
| 2,197,260 | Pickett | Apr. 16, 1940 |
| 2,253,280 | Lormor | Aug. 19, 1941 |
| 2,308,086 | Landrock | Jan. 12, 1943 |
| 2,638,487 | Conner | July 13, 1954 |

FOREIGN PATENTS

| | | |
|---|---|---|
| 350,158 | Germany | Mar. 14, 1922 |